(12) United States Patent
Lobete et al.

(10) Patent No.: US 11,665,305 B2
(45) Date of Patent: May 30, 2023

(54) DEVICE AND METHOD FOR PROCESSING FRAMES

(71) Applicant: Samsung Electronics Co., Ltd., Suwon-si (KR)

(72) Inventors: Daniel Ansorregui Lobete, Staines (GB); Fernando Escribano Macias, Staines (GB); Albert Saa-Garriga, Staines (GB); Ramesh Munikrishnappa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 17/288,715

(22) PCT Filed: Oct. 17, 2019

(86) PCT No.: PCT/KR2019/013622
§ 371 (c)(1),
(2) Date: Apr. 26, 2021

(87) PCT Pub. No.: WO2020/091271
PCT Pub. Date: May 7, 2020

(65) Prior Publication Data
US 2021/0400170 A1     Dec. 23, 2021

(30) Foreign Application Priority Data
Nov. 1, 2018   (GB) ...................................... 1817905

(51) Int. Cl.
*H04N 5/04*       (2006.01)
*G09G 5/00*       (2006.01)
(Continued)

(52) U.S. Cl.
CPC ............... *H04N 5/04* (2013.01); *G09G 5/008* (2013.01); *H04N 5/44* (2013.01); *H04N 7/0135* (2013.01);
(Continued)

(58) Field of Classification Search
CPC ............... G09G 5/008; G09G 2310/08; G09G 2330/021; H04N 5/04; H04N 5/44; H04N 7/0135
See application file for complete search history.

(56) References Cited

U.S. PATENT DOCUMENTS 6,297,852 B1   10/2001   Laksono et al.
8,325,271 B2   12/2012   Huang et al.
(Continued)

FOREIGN PATENT DOCUMENTS

JP     2009-302755 A     12/2009
KR   10-2010-0005242 A    1/2010
WO     2010/116588 A1    10/2010

OTHER PUBLICATIONS

Great Britain Search and Examination Report dated Apr. 15, 2019, issued in Great Britain Patent Application No. GB1817905.1.

*Primary Examiner* — Roy P Rabindranath
(74) *Attorney, Agent, or Firm* — Jefferson IP Law, LLP

(57) ABSTRACT

Embodiments disclosed herein relate to device and method for processing frames. For example, a buffer of a device is arranged to store a plurality of rendered frames rendered at a frame rendering rate and a time stamp for each of rendered frames. A compositor of a device is arranged to obtain a timestamp of a synchronisation signal for synchronising the display of frames with a display refresh rate. In response to obtaining a timestamp of a synchronisation signal, a compositor is arranged to trigger access to a buffer to obtain two rendered frames having timestamps closest to a timestamp of a synchronisation signal. An interpolator of a device is
(Continued)

arranged to generate an interpolated rendered frame for display by performing an interpolation operation using two rendered frames. An interpolation operation takes into account the difference between timestamps of each of two rendered frames and a timestamp of a synchronisation signal.

20 Claims, 11 Drawing Sheets

(51) Int. Cl.
*H04N 5/44* (2011.01)
*H04N 7/01* (2006.01)

(52) U.S. Cl.
CPC ... *G09G 2310/08* (2013.01); *G09G 2330/021* (2013.01)

(56) References Cited

U.S. PATENT DOCUMENTS

| | | |
|---|---|---|
| 8,941,667 B2 | 1/2015 | Gedik et al. |
| 2004/0008776 A1 | 1/2004 | Haskell et al. |
| 2004/0046891 A1 | 3/2004 | Mishima et al. |
| 2004/0252230 A1 | 12/2004 | Winder |
| 2012/0019719 A1 | 1/2012 | Takesue et al. |
| 2013/0141642 A1 | 6/2013 | Wu et al. |
| 2015/0348509 A1 | 12/2015 | Verbeure et al. |
| 2016/0100129 A1 | 4/2016 | Im |
| 2019/0043448 A1* | 2/2019 | Thakur ................. G09G 5/001 |

* cited by examiner

DEVICE AND METHOD FOR PROCESSING FRAMES

CROSS-REFERENCE TO RELATED APPLICATION(S)

This application is a U.S. National Stage application under 35 U.S.C. § 371 of an International application number PCT/KR2019/013622, filed on Oct. 17, 2019, which is based on and claims priority of a Great Britain application number 1817905.1, filed on Nov. 1, 2018, in the Great Britain Intellectual Property Office, the disclosure of which is incorporated by reference herein in its entirety.

TECHNICAL FIELD

The disclosure is directed towards a device and method for processing rendered frames. In particular, the disclosure is directed towards a device and method for processing rendered frames such that they may be displayed at a display refresh rate.

BACKGROUND ART

Referring to FIG. 1, there is shown a device 1 according to an existing implementation. The device 1 comprises a display 11 which displays content at a display refresh rate. The display 11 provides a vertical synchronisation signal, VSYNC, to a compositor 13. The vertical synchronisation signal is used by the compositor 13 so as to control how rendered content is provided to the display 11. This may be, for example, to prevent an incompletely rendered frame from being displayed. The VSYNC rate is typically fixed in displays such as those using Organic Light-Emitting Diode (OLED) technology. In response to receiving the synchronisation signal, the compositor 13 fetches rendered frames of content from buffers 15, 19 so that rendered frames of content may be displayed on the display at each display refresh rate. A first of the buffers 15 stores the most recent frame of content rendered by a game engine 17. A second of the buffers 19 stores the most recent frame of content rendered by other processes 21 of the device 1.

Referring to FIG. 2, there is shown a detailed view of the compositor 13, buffer 15, and game engine 17. In FIG. 2, it can be seen that the buffer 15 stores a rendered frame of content and a timestamp indicating the time at which the frame of content was rendered. The game engine 17 renders frames and pushes the rendered frames to the buffer 15. The vertical synchronisation signal VSYNC triggers the compositor 13 to access the most recently rendered frame from the buffer so that the rendered frame may be displayed. The compositor 13 also controls the buffer to release old frames. A dequeue request is also sent to the game engine 17.

DISCLOSURE OF INVENTION

Solution to Problem

It is an object of the disclosure to improve, or at least provide an alternative to, existing approaches for displaying rendered frames of content. In particular, it is an object of the disclosure to display rendered frames of content in a way which is smoother/a better representation of the actual motion within the content.

An embodiment herein may provide a method of processing frames to display. The method may comprise, storing a plurality of first frames having timestamps, the first frames being obtained at a first rate, identifying a timestamp of a synchronisation signal to display at a second rate, identifying two first frames among the first frames based on the timestamp of the synchronisation signal, the two first frames having timestamps closest to the timestamp of the synchronisation signal, and generating a second frame to display using the two first frames. A timestamp for each of the first frames may be delayed by a predetermined delay value, or the predetermined delay value may be subtracted from the timestamp of the synchronisation signal, for identifying the two first frames.

An embodiment herein may provide an electronic device for processing frames to display. The electronic device may comprise, a memory, and at least one processor coupled to the memory, the at least one processor configured to store a plurality of first frames having timestamps in the memory, the first frames being obtained at a first rate, identify a timestamp of a synchronisation signal to display at a second rate, identify two first frames among the first frames based on the timestamp of the synchronisation signal, the two first frames having timestamps closest to the timestamp of the synchronisation signal, and generate a second frame to display using the two first frames. A timestamp for each of the first frames may be delayed by a predetermined delay value, or the predetermined delay value may be subtracted from the timestamp of the synchronisation signal, for identifying the two first frames.

BRIEF DESCRIPTION OF DRAWINGS

For a better understanding of the disclosure, and to show how embodiments of the same may be carried into effect, reference will now be made, by way of example only, to the accompanying diagrammatic drawings in which.

MODE FOR THE INVENTION

Figure 1:
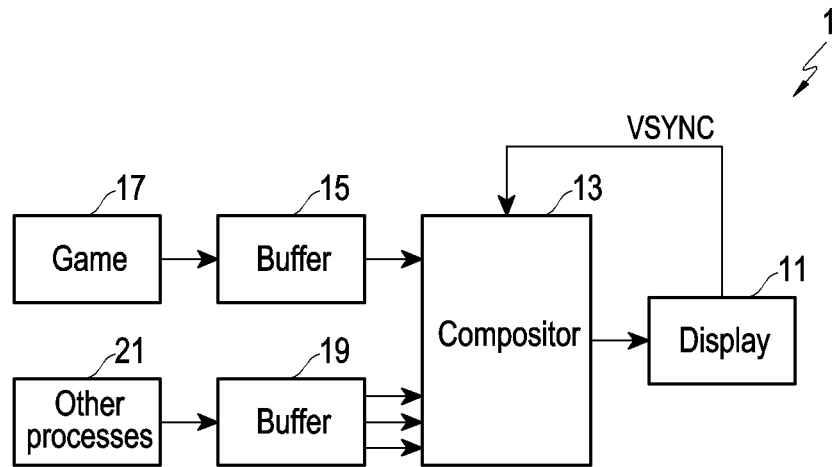
FIG. 1 is a schematic diagram of a device for processing rendered frames according to an existing implementation.
Figure 2:
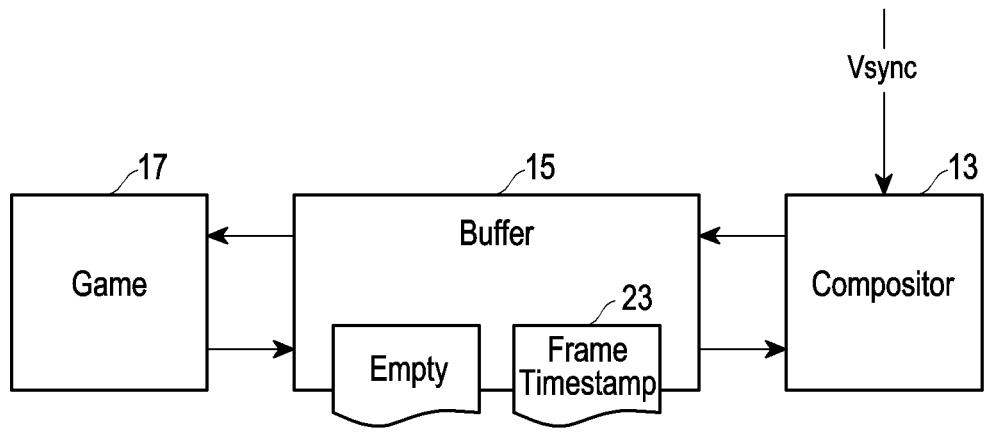
FIG. 2 is a detailed view of an aspect of the device of FIG. 1.
Figure 3:
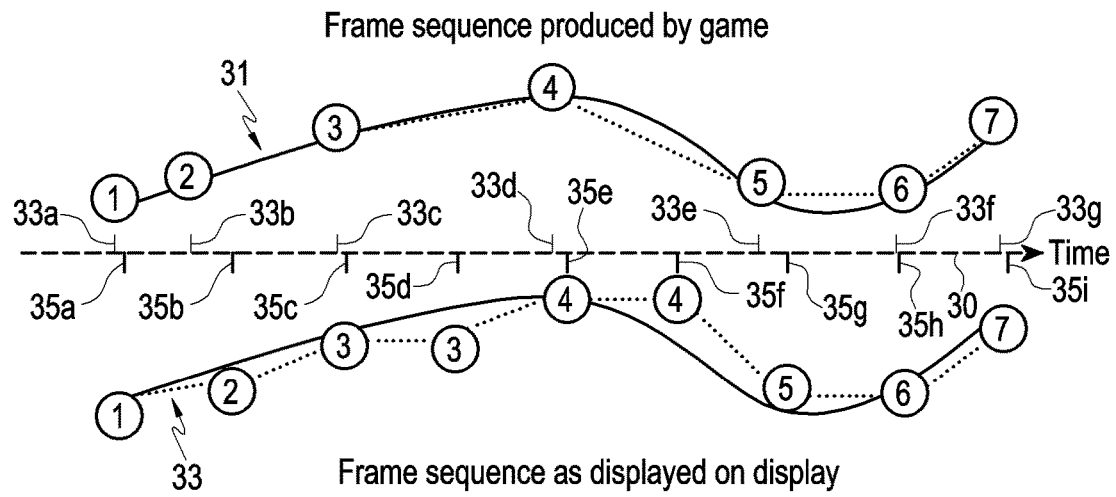
FIG. 3 is a frame sequence diagram for displaying rendered frames according to an existing implementation.

Referring to FIG. 3, there is shown an example frame sequence diagram showing how frames of content are rendered and displayed according to the device of FIGS. 1 and 2. FIG. 3 relates to the rendering and display of game frames as rendered by the game engine 17. The top half of FIG. 3 is a plot 31 showing the rendering of content by the game engine 17 against time. The bottom half of FIG. 1 is a plot 33 showing the display of the rendered content against time. Both plots have a common x-axis 30 representing the flow of time. The y-axis of both plots indicates the level of motion within the content. The solid lines in both plots represent the actual motion content in the game, whereas the dotted lines represent the motion content seen by the user as a result of the displayed rendered frames of content.

The plot 31 of FIG. 3 shows that frames of content are rendered at discrete time points. The rendered frames are labelled 1, 2, 3, 4, 5, 6, and 7. The time at which the frames 1, 2, 3, 4, 5, 6, 7 are rendered are indicated by the dashes 33a, 33b, 33c, 33d, 33e, 33f, and 33g on the time axis 30. The frames of content are rendered at a game frame rendering rate. The game frame rendering rate is variable. It may take longer for frames to be rendered if the content to be rendered is complex. In addition, the time taken to render frames may be subject to device constraints.

The plot 33 of FIG. 3 shows the rendered frames of content 1, 2, 3, 4, 5, 6, 7 are displayed at discrete time points. The rendered frames of content are displayed at a display refresh rate. The dashes 35a, 35b, 35c, 35d, 35e, 35f, 35g, 35h on the time axis 30 represent the times at which the display refreshes. The display refresh rate is fixed.

A problem with the approach of FIG. 3 is that the uneven times at which frames are rendered can lead to the rendered content being displayed in a jerky and otherwise undesirable way. This is because the delay between a frame finishing, and it being displayed is variable for each frame. For example, it can be seen that frame 1 is rendered at time 33a, and the next display refresh occurs shortly afterwards at time 35a. Frame 2 is then rendered at time 33b, but there is a larger time delay to the next display refresh at time 35b. This produces uneven rates of motion in the display of the rendering content. In the context of game frames, this can make the gameplay appear jerky. The dashed lines in the plot 32 of FIG. 3 show how the displayed rendered frames do not accurately correspond to the actual motion content as indicated by the solid line.

Another problem with the approach of FIG. 3 is that if a frame takes too long to render, then a display refresh may occur before the content has finished rendering. Because of this, the display of the previous rendered frame is repeated. For example, in FIG. 3 it can be seen that the frame 3 is displayed at time 35c and again at time 35d due to the delay in rendering frame 4.

One way to mitigate for the problem of variable delays between the time at which a frame is rendered and a time at which it is displayed, would be to display the frames as they are rendered. However, typical displays can only be refreshed at a fixed display refresh rate.

It is also known to capture video frames at a certain capture rate, e.g. 30 frames per second (FPS), and interpolate between the captured frames to generate additional video frames for display, e.g. to up-convert the content to 60 FPS. A similar approach may be applied to frames of rendered content so as to generate additional rendered frames.

Figure 4:
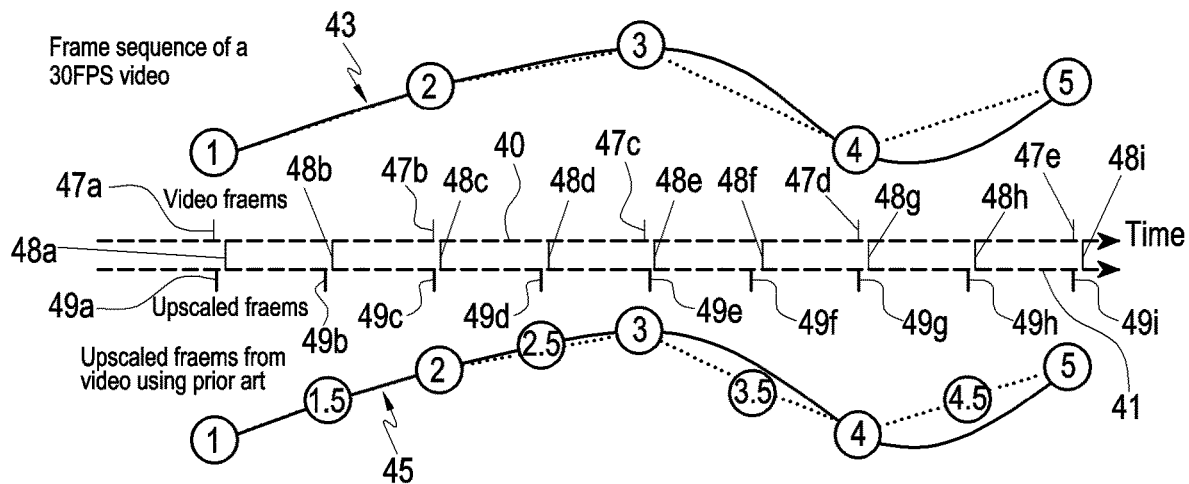
FIG. 4 is a frame sequence diagram for displaying up-converted video frames according to an existing implementation.

Referring to FIG. 4, there is shown an example frame sequence diagram showing how video frames are displayed according to existing implementations. The top half of FIG. 4 is a plot 43 of video frames. The dashed arrow 40 represents the time axis for the top half plot 43. The bottom half of FIG. 4 is a plot 45 showing the display of video frames. The dashed arrow 41 represents the time axis for the bottom half plot 45. The time axis 41 is not the same as the time axis 40. In particular, the time axis 41 is typically shifted at least two frames into the future. This is just so that the two plots can be displayed on the same page for ease of comparison. The solid lines in both plots 43, 45 indicate the actual motion content, whereas the dashed lines represent how the motion content is represented in the displayed content.

The plot 43 of FIG. 4 shows that the video frames 1, 2, 3, 4, 5 are captured at discrete time points indicated by the dashes 47a, 47b, 47c, 47d, 47e on the time axis 41. The video frames are captured at a fixed frame rate of 30 FPS. This contrasts with rendered frames such as game frames where the rendered frame rate varies depending on factors such as the content to be rendered and the workload of the device.

The plot 45 of FIG. 4 shows the video frames 1, 2, 3, 4, 5 are displayed at the display refresh rate. In addition, plot 45 shows that the captured video frames are up-converted from 30 FPS to 60 FPS for display so that the video frames are displayed at a higher frame rate than they were captured. The up-converting operation creates frames at the exact halfway point (or other even spacing if a different up-converting rate is used) between frames. For example, FIG. 4 shows that interpolated video frames 1.5, 2.5, 3.5, 4.5, and 5.5 are generated at the exact halfway point between the original captured video frames. FIG. 4 shows that there is an even spacing between all of the up-converted frames. The dashes 48a, 48b, 48c, 48d, 48e, 48f, 48g, 48h, 48i represent the times at which the display refreshes. The display refreshes at 60 frames per second. The dashes 49a, 49b, 49c, 49d, 49e, 49f, 49g, 49h, 49i represent the times of the up-converted video frames.

Figure 5:
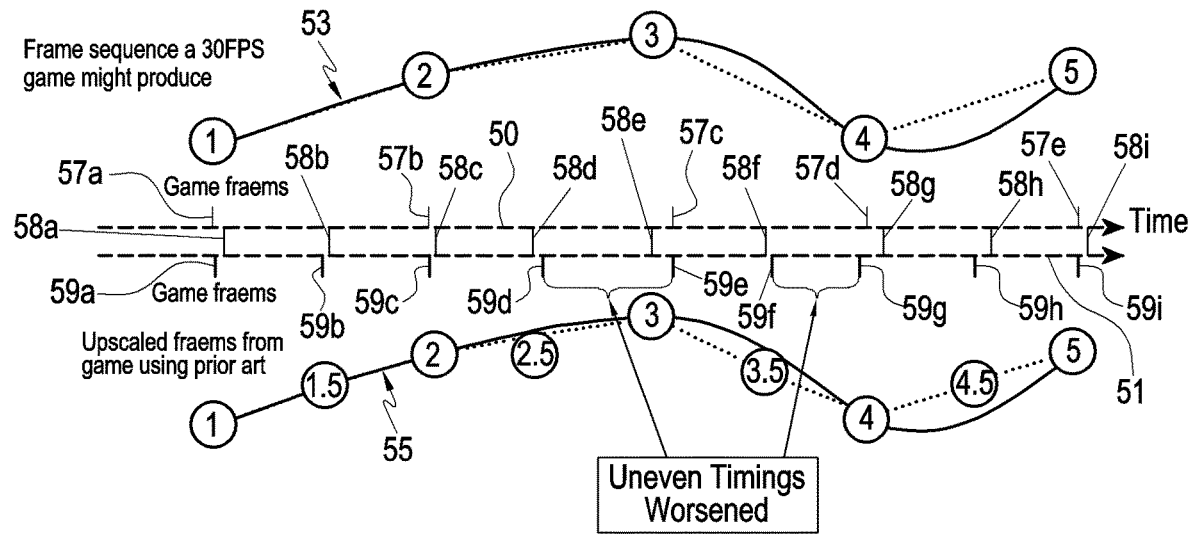
FIG. 5 is a frame sequence diagram for up-converting rendered frames using the existing approach for up-converting video frames as shown in FIG. 4.

Referring to FIG. 5, there is shown an example frame sequence diagram for the up-converting off rendered frames using the video interpolation approach of existing implementations. The top half of FIG. 5 is a plot 53 of rendered frames 1, 2, 3, 4, 5. The dashed arrow 50 represents the time axis for the top half plot 53. The bottom half of FIG. 5 is a plot 55 showing the up-converted rendered frames 1, 1.5, 2, 2.5, 3, 3.5, 4, 4.5, 5. The dashed arrow 51 represents the time axis for the bottom half plot 55. The time axis 51 is shifted by two frames relative to the time axis 50, again this is just for ease of representation so that the two plots may easily be compared. Effectively, this means that the rendered frames are delayed by approximately the time taken to render two frames. The solids lines in the plots 53, 55 represent the actual motion of the content whereas the dashed lines represent how the motion appears in the up-converted rendered frames.

The plot 53 of FIG. 5 shows the frames 1, 2, 3, 4, 5 are rendered at time points indicated by the dashes 57a, 57b, 57c, 57d, 57e on the time axis 50. The average game frame rendering rate in this example is 30 frames per second, but the time taken to render individual frames is variable.

The plot 55 of FIG. 5 shows that the rendered frames are up-converted from 30 frames per second to 60 frames per second for display. The rendered frames are interpolated using the video interpolation methods mentioned above, so that frames are created at the exact halfway point between the rendered frames. FIG. 5 shows that interpolated rendered frames 1.5, 2.5, 3.5, 4.5, and 5.5 are generated at the exact halfway point between the original rendered frames. The dashes 59a, 59b, 59c, 59d, 59e, 59f, 59g, 59h, 59i represent the timestamps of the up-converted rendered frames.

The up-converted video frames 1, 1.5, 2, 2.5, 3, 3.5, 4, 4.5, 5 will be displayed at the display refresh rate. The dashes 58a, 58b, 58c, 58d, 58e, 58f, 58g, 58h, 58i represent the times at which the display refreshes.

While the video interpolation approach may help at least partially mitigate the problem of repeated frames, the uneven times at which the frames are rendered can still lead to the rendered content being displayed in a jerky and undesirable way. This is because the delay between a frame finishing, and it being displayed is still variable for each frame.

It is an object of the disclosure to improve, or at least provide an alternative to, existing approaches for displaying rendered frames of content. In particular, it is an object of the disclosure to display rendered frames of content in a way which is smoother/a better representation of the actual motion within the content.

According to various embodiments of the disclosure, there is provided an apparatus and method as set forth in the appended claims. Other features of the disclosure will be apparent from the dependent claims, and the description which follows.

According to a first aspect of the disclosure, there is provided a device for processing rendered frames for display at a display refresh rate. The device comprises a buffer arranged to store a plurality of rendered frames rendered at a frame rendering rate and a timestamp for each of the rendered frames. The device comprises a compositor arranged to obtain a timestamp of a synchronisation signal for synchronising the display of frames with the display refresh rate. In response to obtaining the timestamp of the synchronisation signal, the compositor is arranged to trigger access to the buffer to obtain two rendered frames having timestamps closest to the timestamp of the synchronisation signal. The device further comprises an interpolator arranged to generate an interpolated rendered frame for display by performing an interpolation operation using the obtained two rendered frames. The interpolation operation takes into account the difference between the timestamps of each of the two rendered frames and the timestamp of the synchronisation signal.

The disclosure does not just interpolate between two rendered frames so as to generate a new frame representing the halfway point between the two rendered frames. Instead, the disclosure controls what particular rendered frames are obtained, and how the interpolation operation is performed according to the timestamp of the synchronisation signal. In particular, the disclosure obtains the two rendered frames having timestamps closest to the timestamp of the synchronisation signal, and then interpolates between the two rendered frames in a way which takes into account the difference between the timestamps of each of the two rendered frames and the timestamp of the synchronisation signal. This interpolation approach effectively retimes the original rendered frames and modifies the content of the original rendered frames such that they are synchronised with the synchronisation signal.

One of the obtained rendered frames may have a timestamp before the timestamp of the synchronisation signal. The other of the obtained rendered frames may have a timestamp after the timestamp of the synchronisation signal. This may mean that the closest past frame and the closest future frame relative to the synchronisation signal may be obtained.

The interpolation operation may weigh the influence of the two rendered frames in generating the interpolated rendered frame. The rendered frame having the timestamp closest to the synchronisation signal may have a greater influence on the interpolated rendered frame. For example, a pixel of the interpolated rendered frame may have a pixel value which corresponds to a blend of the pixels values of the corresponding pixel location in the obtained rendered frames. For example, each pixel of the interpolated rendered frame may have a pixel value which corresponds to a blend of the pixel values of the corresponding pixel location in the rendered frames.

The interpolation operation may comprise a weighted average operation. In this example, a pixel of the interpolated rendered frame may have a pixel value which corresponds to the weighted average of the pixels values of the corresponding pixel location in the obtained rendered frames. In this example, each pixel of the interpolated rendered frame may have a pixel value which corresponds to the weighted average of the pixels values of the corresponding pixel location in the obtained rendered frames. The weighted average may take in account the difference between the timestamps of the rendered frames and the timestamp of the synchronisation signal such that the rendered frame closest to the timestamp of the synchronisation signal will have a greater influence (i.e. a greater weight).

The interpolation operation may comprise a block matching operation. The block matching operation may comprise obtaining motion vectors between the two rendered frames, and using the motion vectors to interpolate between the rendered frames.

Other interpolation operations may be suitable for use with the disclosure. The weighted average operation is, however, particularly beneficial in view of its low computational cost and acceptable performance.

Each of the rendered frames displayed at the refresh rate may be an interpolated rendered frame. This may means that the interpolator uses the rendered frames to create synthesised frames, and that only the synthesised frames, i.e. the rendered interpolated frames, are displayed. This contrasts with video interpolation approaches which create new frames between existing frames.

The device may be arranged to display the interpolated rendered frames after all of the frames of content have been rendered. This may be referred to as offline processing.

The device may be arranged to display the interpolated rendered frames while frames of content are still be rendered. This may be referred to as online processing.

In an example online processing operation, the compositor may be arranged to trigger access to the buffer to obtain two rendered frames having timestamps closest to the timestamp of the synchronisation signal, when the timestamps of the rendered frames are delayed by a predetermined delay value. The interpolation operation may take into account the difference between the timestamps of each of the two rendered frames and the timestamp of the synchronisation signal, when the timestamps of the rendered frames are delayed by the predetermined delay value. Here, "when delayed by the predetermined delay value" does not mean that the timestamps of the rendered frames must be delayed by the predetermined delay value. The timestamps of the rendered frames may be unchanged and instead the predetermined delay value may be subtracted from the timestamp of the synchronisation signal so as to achieve an equivalent effect.

The predetermined delay value may be determined according to the display refresh rate. In other words, the predetermined delay value may be determined according to the display refresh period.

The predetermined delay value may be determined according to the frame rendering rate. In other words, the predetermined delay value may be determined according to the time taken to render one or more frames. The frame rendering rate may be an average frame rendering rate.

The predetermined delay value may be determined according to a time taken to render two frames at the frame rendering rate and a time taken to refresh the display at the display refresh rate. In particular, the predetermined delay value may be equal to the time taken to the render two frames at the frame rendering rate plus the time taken to refresh the display at the display refresh rate. The predetermined delay value may additionally or separately be determined according to one or more user centric metrics. The user centric metrics may include one or more of the level user interaction with the device, the level of user attention in relation to the content of the device, and user biometrics. In some examples, the user may be able to increase or decrease the predetermined delay value by interacting with a user interface of the device.

The predetermined delay value may be between 3 and 160 milliseconds. The predetermined delay value may be between 8 and 160 milliseconds. The predetermined delay value may be between 16 and 160 milliseconds. The predetermined delay value may be between 3 and 160 milliseconds. The predetermined delay value may be between 3 and 120 milliseconds. The predetermined delay value may be between 3 and 80 milliseconds. The predetermined delay value may be between 30 and 50 milliseconds, and may be 40 milliseconds.

The device may be delay the timestamps of the rendered frames by the predetermined delay value. This may mean that prior to the compositor being arranged to trigger access to the buffer to obtain the two rendered frames having timestamps closest to the timestamp of the synchronisation signal, the device delays the timestamps of the rendered frames by the predetermined delay value. The delaying may comprise adding the predetermined delay value to the timestamp of the rendered frame.

The device may be operable to subtract the predetermined delay value from the timestamp of the synchronisation signal. This may mean that prior to the compositor being arranged to trigger access to the buffer to obtain the two rendered frames having timestamps closest to the timestamp of the synchronisation signal, the device subtracts the predetermined delay value from the timestamp of the synchronisation signal.

The predetermined delay value may constant. That is, the timestamps of each of the rendered frames may be delayed by the same predetermined delay value. Or, the timestamps of each of the synchronisations signals may have the same predetermined delay value subtracted therefrom.

In an offline processing operation, the timestamps of the rendered frames do not need to be delayed by the predetermined delay value. Further, the predetermined delay value does not need to be subtracted form the timestamp of the synchronisation signal. This is because in offline processing all of the frames are rendered in advance. As such, a delay is not required to ensure that sufficient frames are rendered prior to performing the interpolation operation.

The frame rendering rate may be variable.

The frame rendering rate may be lower than the display refresh rate. The interpolation operation comprises up-converting the rendered frames to the display refresh rate.

The device may be arranged to control the frame rendering rate. The device may be arranged to control the interpolation operation based on the change in frame rendering rate such that rendered content may still be displayed at the display refresh rate. For example, if the display refresh rate is set to 60 FPS, and the frame rendering rate is reduced to 30 FPS, the interpolation operation may generate interpolated rendered frames for display at the display refresh rate of 60 FPS.

The device may be arranged to control the frame rendering rate according to content linked to the rendered frames.

The device may be arranged to detect an amount of motion in content linked to the rendered frames. This may mean that frame rendering rate is decreased such that less power is consumed by the device when the detected amount of motion is lower than a threshold value.

The device may be arranged to control the frame rendering rate according to aspects such as the significance of the motion rather than or in addition to the amount of motion. This may involve determining the saliency of the motion, the depth of motion, or the particular plane in 3D space in which the motion is occurring. Generally, when the amount of motion or the significance of the motion is reduced, the frame rendering rate may be decreased so as to reduce power consumption.

The device may be arranged to control the frame rendering rate according to the detected amount of motion. The device may be arranged to detect motion through inspection of the rendered frames using a motion estimation operation such as a motion search. Machine learning techniques may also be used to detect amounts of motion within the rendered frames. The amount of motion may be detected by receiving information other than the rendered frames from the game engine. The amount of motion may be detected via a user input to the device. For example, if a user makes a large and fast dragging motion across a touch screen of the device, the device may infer that there will be a large and quick scrolling motion which will be reflected in the rendered frames.

The device may be arranged to control the frame rendering rate so as to control a power consumption level of the device.

The device may be arranged to detect a battery level of the device, and may be arranged to control the frame rendering rate according to the detected battery level. The device may be a portable electronic device such as a smartphone or tablet. The device may be able to reduce the frame rendering rate based on the detected battery level so as to reduce the power consumption of the device.

The device may be arranged to control the frame rendering rate according to a detected temperature level of the device. This may mean that the device is able to detect the temperature level of the device, and reduce the frame rendering rate if the detected temperature level exceeds a threshold value.

The device may be arranged to control the frame rendering rate according to a detected of level of user interaction with the device. This may mean that the device is able to reduce the frame rendering rate if the level of the user interaction with the device is reduced below a threshold value. This has the benefit of reducing the power consumption when the user is not actively interacting with the content. Conversely, this may mean that the device is able to increase the frame rendering rate if the level of the user interaction with the device is increased above a threshold value. For example, the level of user interaction may consider the direction and/or amount of motion inputted by a user input of the device such as a touch screen (e.g. how long and/or fast the swipe movement is), or as detected by an accelerometer of the user. Other approaches of detecting the level of user interaction will be readily apparent to the skilled person.

The device may be arranged to control the frame rendering rate according to a detected level of user attention in relation to the content of the device. This may mean that the device is able to reduce the frame rendering rate if the level of the user attention in relation to the content of the device (e.g. displayed on the device) is reduced below a threshold value. This has the benefit of reducing the power consumption when the user is not actively engaged with the content. Conversely, this may mean that the device is able to increase the frame rendering rate if the level of the user attention increases above a threshold value. The level of user attention may be detected using eye gaze detection or emotion recognition. In some examples, if the level of user attention in relation to the content of the device is reduced, the frame rendering rate may also be decreased so as to reduce power consumption. This may mean if a user is not consistently gazing at the display of the device, the frame rendering rate is reduced.

The device may be arranged to control the frame rendering rate according to measured user biometrics. This may mean that the device is able to reduce the frame rendering rate if a user biometric value (e.g. the heart rate) is reduced below a threshold value. This has the benefit of reducing the power consumption when the user is not actively engaged with the content. Conversely, this may mean that the device is able to increase the frame rendering rate if the user biometric value increases above a threshold value. The biometrics may include one or more of the user heart rate, breath frequency or body temperature. The user biometrics may be determined using appropriate sensors that are communicatively coupled to the device. This may mean that if the user biometrics indicate that the user is relaxed (e.g. a low heart rate, and/or a low breath frequency, and/or a low body temperature) the frame rendering rate may be reduced.

The rendered frames may be game frames. The game frames may be rendered by a game engine. The device may comprise or be associated with the game engine. The game engine may be implemented a graphics processing unit (GPU) of the device.

The rendered frames are not required to be game frames. Other forms of rendered frames of content are within the scope of the disclosure. For example, any form of graphical simulation content which may be rendered is within the scope of the disclosure. Any content which may be rendered for display may have the problem of a variable rendering rate as described above, and thus the disclosure will be applicable in terms of smoothing or otherwise reducing the appearance of jerky motion within the rendered content. In some examples, the rendered content may be augmented reality (AR), virtual reality (VR), or mixed reality (MR) rendered content.

The device may be a portable electronic device such as a mobile device. The mobile device may be a tablet or a smartphone. The mobile device may have a user interface such as a touch screen.

The device may further comprise or may be associated with a display for displaying the interpolated rendered frame. The display may be an integral part of the device. The display may be separate from, but communicatively coupled, to the device.

The interpolator may be a function block or module. The compositor may be a function block or module. The interpolator may be part of or separate to the compositor. The interpolator may be disposed, at least functionally, between the renderer (e.g. a game engine) and the compositor. The interpolator may access the buffer so as to obtain the rendered frames. The interpolator may be triggered to access the buffer by the compositor. The interpolator may be operable to control the buffer, and adjust the timestamps of rendered frames within the buffer. The interpolator may be operable to control the timing of the rendered content by controlling the buffer. The interpolator may provide the interpolated rendered frames to the compositor. The compositor may interface with a display so as to display the interpolated rendered content. In some beneficial implementations, the disclosure does not necessarily require modification of the compositor or the renderer (e.g. the game engine). This is because the solution provided by the disclosure may be contained within the graphics framework.

The compositor and/or interpolator may be implemented in software, firmware, or hardware, or a combination of any of software, firmware, or hardware.

Generally, the interpolation approach of the disclosure allows for the timings of rendered frames to be controlled so that frames may be displayed in a way which provides smoother motion of content within the frames. In other words, the existing problem of jerky motion may be reduced. In addition, the interpolation approach of the disclosure is able to compensate for when content fails to be rendered in time for a delay refresh. This is because the disclosure is able to fill missed frames with interpolated frames, rather than existing approaches of repeating the last frame. In addition, the disclosure is able to reduce the rendering frame rate and compensate for this by up-converting the rendered frames. For example, a frame rendered rate of 30 frames per second may be up-converted to 60 frames per second. As another example, a frame rendering rate of 60 frames per second may be up-converted to 120 frames per second. This can improve the user experience.

According to a second aspect of the disclosure, there is provided a method of processing rendered frames for display at a display refresh rate. The method comprises obtaining a timestamp of a synchronisation signal for synchronising the display of the frames with the display refresh rate. The method comprises, in response to obtaining the timestamp of the synchronisation signal, triggering access to a buffer, the buffer storing a plurality of rendered frames rendered at a frame rendering rate and a timestamp for each of the rendered frames. The triggering access is performed so as to obtain two rendered frames having timestamps closest to the timestamp of the synchronisation signal. The method comprises generating an interpolated rendered frame for display by performing an interpolation operation using the obtained two rendered frames. The interpolation operation takes into account the difference between the timestamps of each of the two rendered frames and the timestamp of the synchronisation signal.

According to a third aspect of the disclosure, there is provided a computer readable medium having instructions recorded thereon which, when executed by a processor of a computer, is operable to cause the computer to perform the method as described above in relation to the second aspect of the disclosure.

Figure 6:
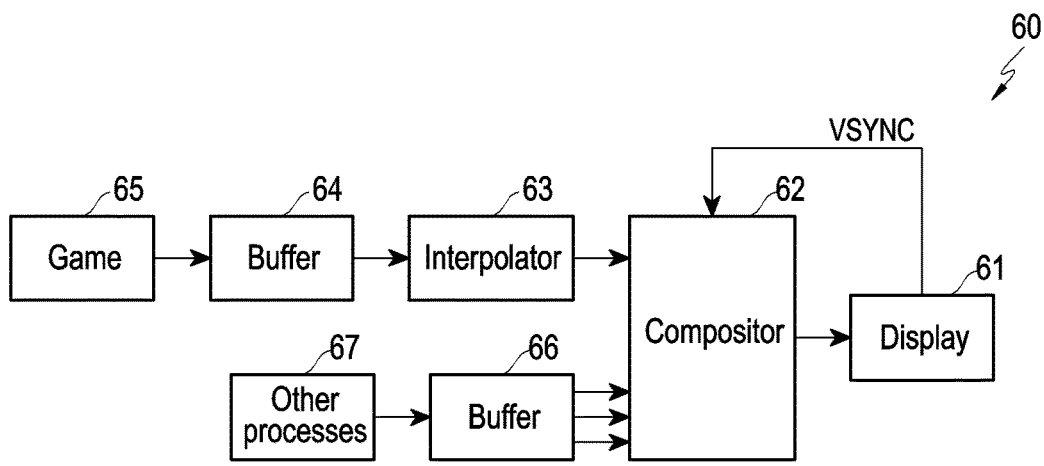
FIG. 6 is a schematic diagram of a device according to aspects of the disclosure.

For a better understanding of the invention, and to show how embodiments of the same may be carried into effect, reference will now be made, by way of example only, to the accompanying diagrammatic drawings in which:

Referring to FIG. 6, there is shown a device 60 according to the first aspect of the disclosure. The device 60 comprises a display 61 which displays content at a display refresh rate. The display 61 provides a vertical synchronisation signal, VSYNC, to a compositor 62. In response to receiving the synchronisation signal, the compositor 62 triggers access to frames of content from the buffers 64 and 66 so that the frames of content may be displayed on the display at each display refresh rate. A first of the buffers 64 stores the most recent frames of content rendered by a game engine 65. A second of the buffers 66 stores the most recent frame of content rendered by other processes 67 of the device 60. The device 60 further comprises an interpolator 63 for interpolating between the rendered frames.

In the particular example of FIG. 6, the device 60 is used to display content as the content is rendered by the game engine. This example is referred to generally as online processing.

The buffer 64 holds a plurality of frames of rendered content along with a timestamp for each of the rendered frames. The compositor 62 triggers access to two frames in the buffer 64 having timestamps closest to the timestamp of the synchronisation signal, when the timestamps of the rendered frames are delayed by a predetermined delay value. Typically, this means that the frame having the closest timestamp before the timestamp of the synchronisation signal, when the timestamps of the rendered frames are delayed by the predetermined delay value, and the frame having the closest timestamp after the timestamp of the synchronisation signal, when the timestamps of the rendered frames are delayed by the predetermined delay value. This means that the closest past and future frames relative to the delayed timestamp of the synchronisation signal are obtained.

The interpolator 63 generates an interpolated rendered frame for display by performing an interpolation operation using the obtained two rendered frames. The interpolation operation takes into account the difference between the timestamps of each of the two rendered frames and the timestamp of the synchronisation signal, when the timestamps of the rendered frames delayed by the predetermined delay value. For example, if one of the frames is closer to the delayed timestamp of the synchronisation signal, then this frame may have a greater influence in the interpolated rendered frame.

Figure 7:
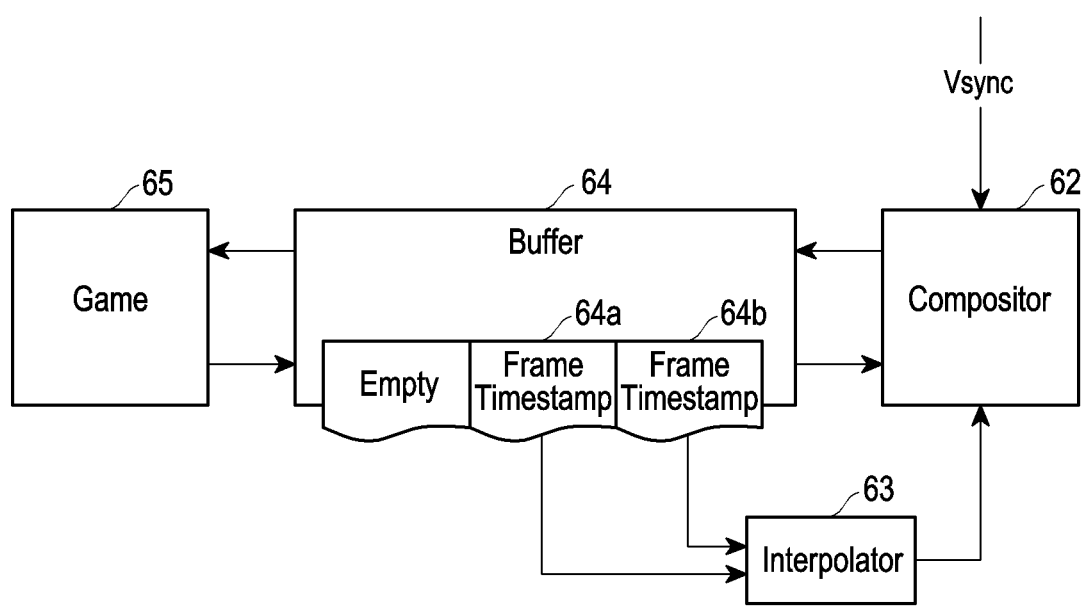
FIG. 7 is a detailed view of an aspect of the device of FIG. 6.

Referring to FIG. 7, there is shown a detailed view of aspects of the device of FIG. 6. FIG. 7 shows that the buffer 64 holds a plurality of frames 64a, 64b of rendered content and their respective timestamps. The closest rendered frames stored in the buffer 64 to the timestamp of the synchronisation signal are provided to the interpolator 63.

Figure 8:
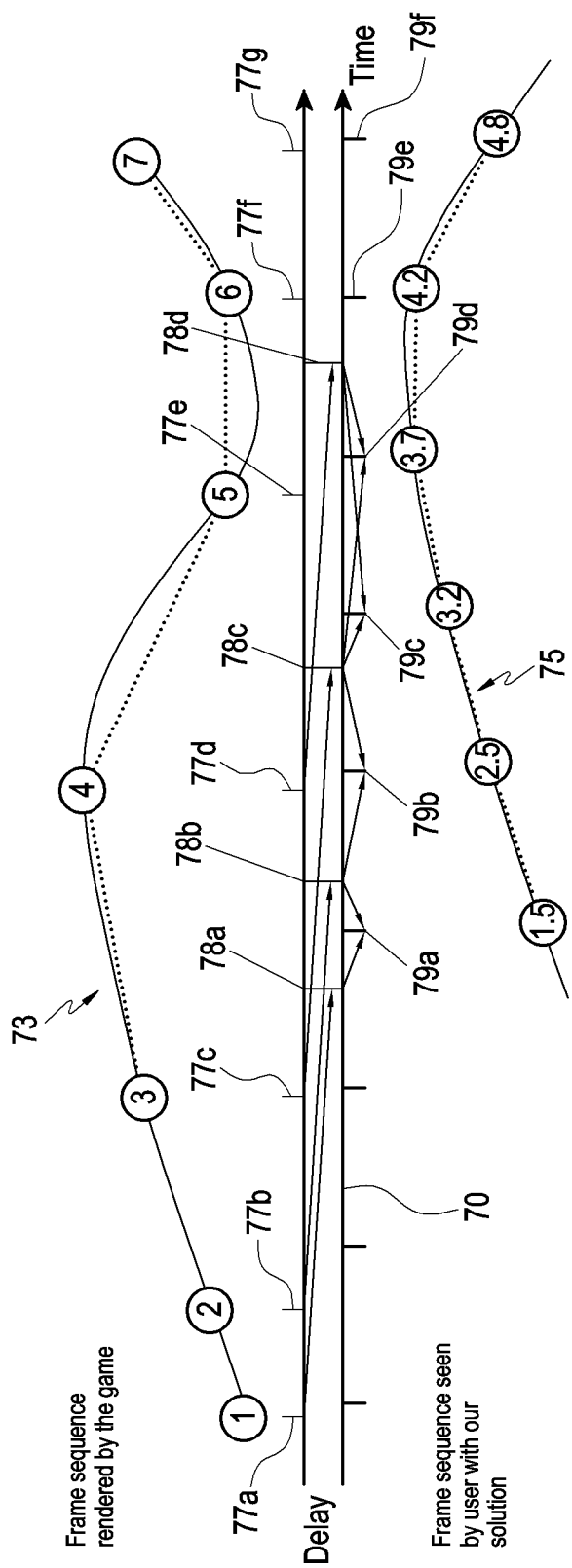
FIG. 8 is a frame sequence diagram for displaying rendered frames according to aspects of the disclosure.

Referring to FIG. 8, there is shown an example frame sequence diagram showing the rendering and display of frames according to aspects of the disclosure.

The top half plot 73 of FIG. 8 shows the rendering of frames of content 1, 2, 3, 4, 5, 6, 7. The y-axis indicates the motion within the content, and the x-axis 70 indicates the time. The time at which the frames 1, 2, 3, 4, 5, 6, 7 are rendered are indicated by the dashes 77a, 77b, 77c, 77d, 77e, 77f on the time axis 70. The time taken to render individual frames is variable which means that there is an uneven time spacing between the rendered frames. The solid lines in the plots 73, 75 of FIG. 8 indicate the actual motion of the content, whereas the dashed lines indicate the motion of the content that would be apparent to the user if the frames were displayed.

FIG. 8 shows that the rendered frames of content are each delayed by a predetermined delay value. In this example, the delay is achieved by adjusting the timestamps of the rendered frames such that they are shifted into the future. In other words, the predetermined delay value is added to each of the timestamps. The delayed timestamps are indicated by the dashes 78a, 78b, 78c, 78d in FIG. 8. Only the delay of frames 1, 2, 3, 4 and 5 are specifically shown in FIG. 8.

The bottom half plot 75 shows the display refresh rate indicated by the dashes 79a, 79b, 79c, 79d, 79e, 79f, 79g, 79h, 79i on the time axis 70. At each display refresh, an interpolated rendered frame 1.5, 2.5, 3.2, 3.7, 4.2, and 4.8. The interpolated frame 1.5 is an interpolation of rendered frames 1 and 2. The time of the display refresh (i.e. the timestamp of the synchronisation signal) is approximately equidistant between the rendered frames 1 and 2 so both of rendered frames 1 and 2 have an equal influence on the interpolated rendered frame 1.5. The interpolated frame 2.5 is an interpolation of rendered frames 2 and 3. The time of the display refresh is approximately equidistant between the rendered frames 2 and 3 so both of rendered frames 2 and 3 have an equal influence on the interpolated rendered frame 2.5. The interpolated frame 3.2 is an interpolation of rendered frames 3 and 4. The rendered frame 3 is closer to the time of the display refresh, and so has a greater influence on the interpolated rendered frame 3.2 than the rendered frame 4. The interpolated frame 4.2 is an interpolation of rendered frames 4 and 5. The rendered frame 4 is closer to the time of the display refresh, and so has a greater influence on the interpolated rendered frame than the rendered frame 5. The interpolated frame 4.8 is an interpolation of rendered frames 4 and 5. The rendered frame 5 is closer to the time of the display refresh, and so has a greater influence on the interpolated rendered frame than the rendered frame 4.

It can be seen that each interpolation operations takes into account the difference between the timestamps of the rendered frames and the display refresh time (the timestamp of the synchronisation signal). The closer the timestamp of the synchronisation signal is to one of the rendered frames, the greater the influence that rendered frame has in the interpolated rendered frame. This has the effect of synchronising the interpolated rendered frame with the synchronisation signal. Effectively, this means that the uneven timing problem present in existing implementations. Furthermore, because each displayed frame is an interpolated frame, that is a synthesised frame made up from a combination of two rendered frames, the problem of missed frames is also avoided.

Figure 9:
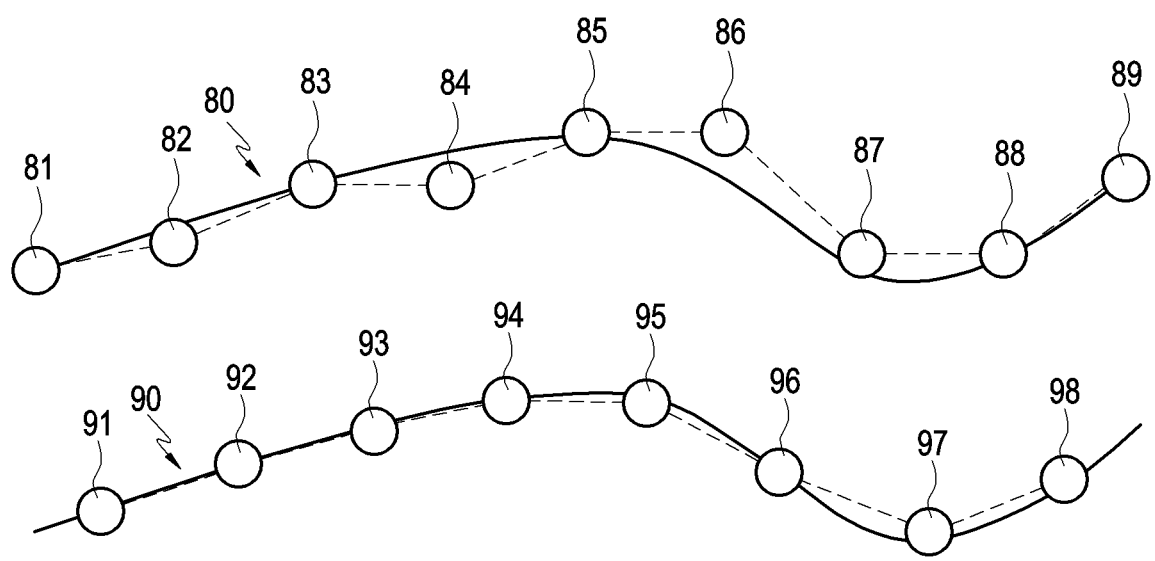
FIG. 9 is a frame sequence diagram comprising the display of rendered frames according to aspects of the disclosure with those of existing implementations.

Referring to FIG. 9, there is shown plots of two displayed rendered frame sequences 80, 81.

The frame sequence 80 corresponds to the approach of existing implementations as described in FIGS. 1 to 3. Each displayed rendered frame is indicated by an oval 81, 82, 83, 84, 85, 86, 87, 88, 89. The solid line indicates the true motion within the content (e.g. a game), and the dashed line indicates the apparent motion that the user views due to the display of the rendered frames 81, 82, 83, 84, 85, 86, 87, 88 and 89. It can be seen that the rendered frames are generally a poor approximation of the motion within the actual game content. This may mean that the displayed content appears jerky and stuttering to the user.

The frame sequence 90 corresponds to approaches in accordance with the disclosure. Each displayed interpolated rendered frame is indicated by an oval 91, 92, 93, 94, 95, 96,

97, 98. The interpolated rendered frames are interpolated according to the approaches described above. The solid line indicates the true motion within the game content, and the dashed line indicates the apparent motion that the user views due to the display of the rendered frames 91, 92, 93, 94, 95, 96, 97, and 98. It can be seen that the interpolated rendered frames in accordance with the disclosure are a better approximation to the motion of the game content, and thus the displayed content will appear less jerky and stuttering the user. While the approach of the disclosure in online processing will require that there is a delay between the rendering of content and the display of interpolated rendered content, any downside in terms of user experience cause by this delay may be offset by the interpolated rendered frames of the disclosure being a better approximation of the actual game content. Furthermore, an appropriate predetermined delay value may be selected so as to minimise any user discomfort cause by the delay between frame rendering and frame display.

Figure 10:
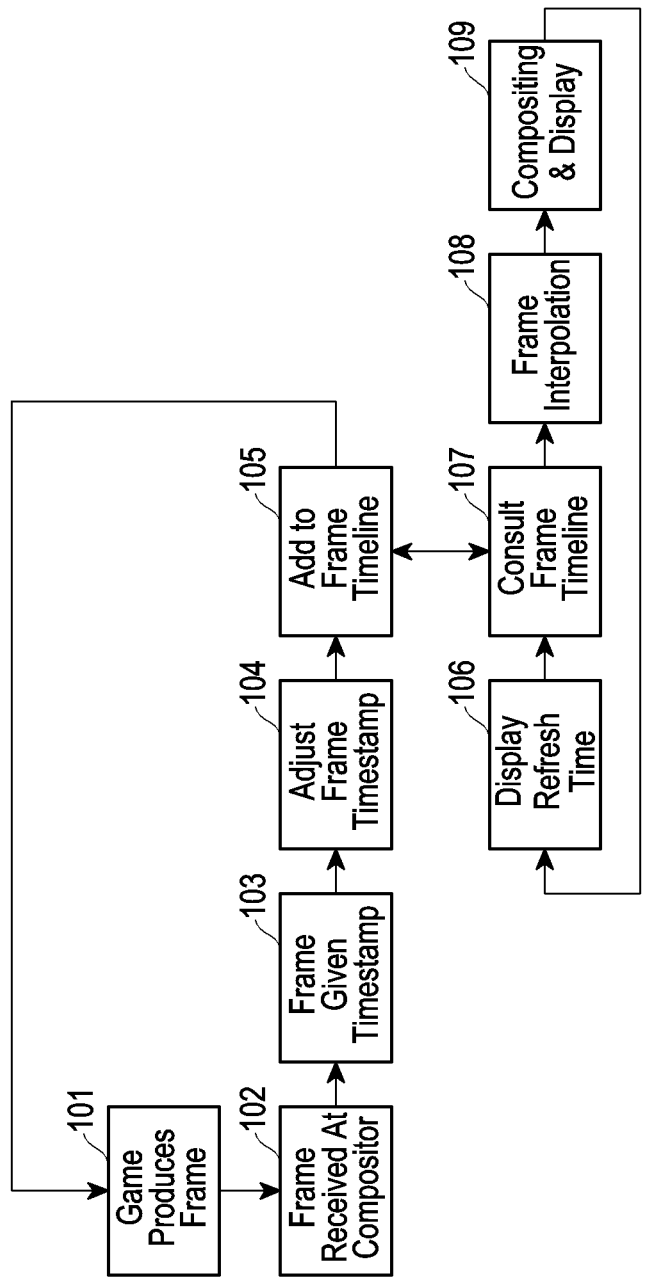
FIG. 10 is a process diagram according to aspects of the disclosure.

Referring to FIG. 10, there is shown an example process flow diagram according to aspects of the disclosure. The process may be performed by the device of FIGS. 6 and 7.

At step 101, the game finishes rendering a frame of content. The frame of content is provided to the compositor and given a timestamp in step 102. The timestamp of the frame is then adjusted by delaying the frame timestamp by the predetermined delay value in step 103. This effectively involves adding the predetermined delay value to the frame timestamp. The frame and the delayed frame timestamp are then added to a frame timeline in step 104. The frame timeline is an example of a buffer. It can be seen in FIG. 9 that steps 101, 102, 103, 104 and 105 are repeated each time a frame of content is rendered by the game.

At step 106 a timestamp for a synchronisation signal of the display is obtained. The frame timeline is then consulted in step 107 so as to obtain two frames having the closest timestamps to the timestamp of the synchronisation signal. One frame has a timestamp before the timestamp of the synchronisation signal (is a past frame). The other frame has a timestamp after the timestamp of the synchronisation signal (is a future frame). The obtained two frames are based to an interpolator and are interpolated in step 108 in a way which takes into account the difference between the timestamps of the two frames and the timestamp of the synchronisation signal. This effectively weights the influence of the two rendered frames in the interpolated frame according to how close the timestamps of the two frames are to the timestamp of the synchronisation signal. The rendered frame is then composed and displayed in step 109. It can be seen in FIG. 10 that steps 106, 107, 108, and 109 are repeated each time the display refreshes. This means that an interpolated rendered frame synched to the synchronisation signal is displayed at every display refresh rate during the game.

Figure 11:
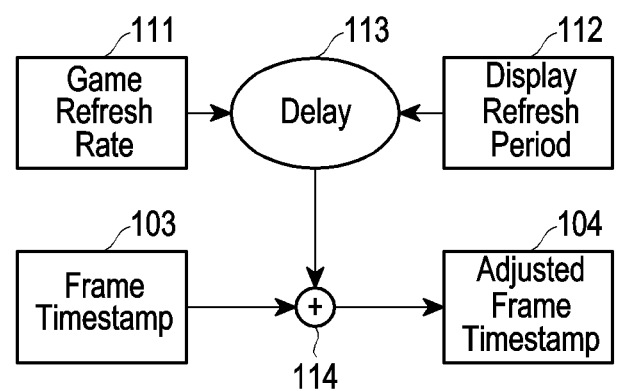
FIG. 11 is a detailed view of an aspect of the process diagram of FIG. 10.

Referring to FIG. 11, there is shown a detailed view of part of the process flow diagram shown in FIG. 10. FIG. 11 shows an example of how the predetermined delay value for delaying the timestamps of the rendered frames may be determined.

In step 111 of FIG. 11, the game refresh rate is provided. The game refresh rate is another way of saying the game frame rendering rate. It will be appreciated that the rate at which frames are rendered is variable. Because of this, the game refresh rate is typically an average representative value of the rendering rate. In step 112, the display refresh period is provided (the display refresh rate could also be provided to achieve the safe effect). In step 113, the game refresh rate and the display refresh period are combined to generate the predetermined delay value. In one example, this will involve adding the time taken to render two frames at the game refresh rate to the display refresh period. In step 114, the predetermined delay value is added to the timestamp value of the rendered frame. It will be appreciated that the predetermined delay value does not need to be calculated each time the game refreshes. Instead, the predetermined delay value may be fixed and calculated in advanced. If, however, the game refresh rate or the display refresh period changes during a game, the predetermined delay value may be recalculated to accommodate for this.

Figure 12:
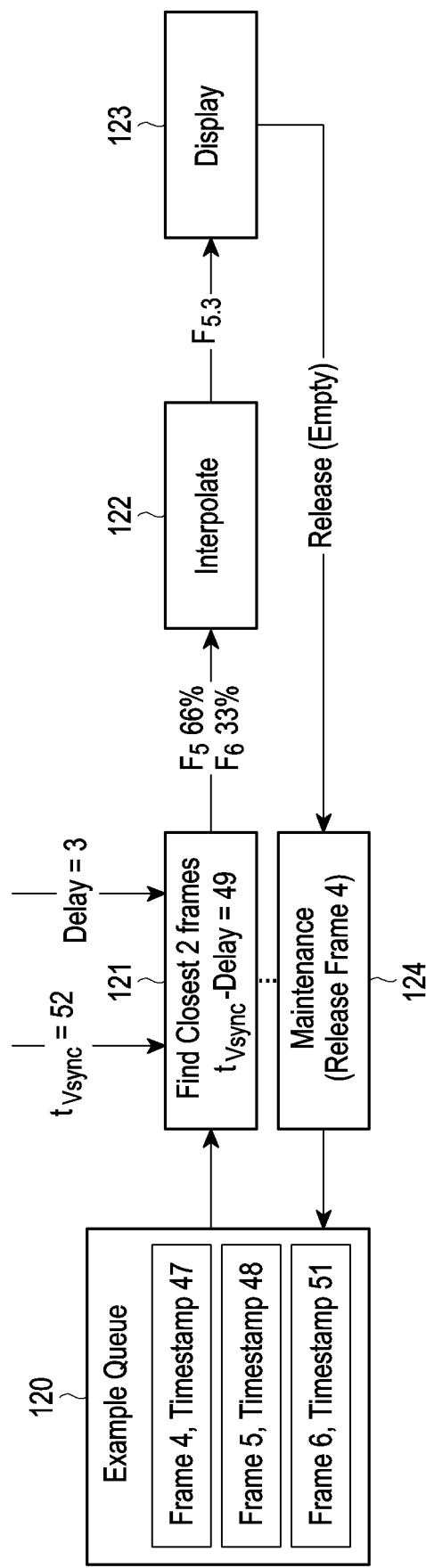
FIG. 12 is another process diagram according to aspects of the disclosure.

Referring to FIG. 12 there is shown another way of obtaining and interpolating frames in accordance with example implementations of the disclosure. In the example, rather than delay the timestamps of the rendered frames by the predetermined delay value, the timestamp of the synchronisation signal is modified by the predetermined delay value.

In step 121, the compositor receives a timestamp value for the synchronisation signal (52 milliseconds) and a predetermined delay value (3 milliseconds). The compositor uses these received values to trigger access to two rendered frames from the frame queue (an example of a buffer) having timestamps closest to the timestamp of the synchronisation signal minus the predetermined delay value (49 milliseconds in this example). In FIG. 12, it can be seen that the frame queue 120 comprises 3 rendered frames and a timestamp for each of these rendered frames. In this example, frames 5 and 6 are obtained from the frame queue because their timestamps are closest to the modified timestamp of the synchronisation signal, and because frame 5 represents a time before the modified timestamp of the synchronisation signal, and frame 6 represents a time after the modified timestamp of the synchronisation signal.

The obtained frames 5 and 6 are passed to the interpolated and interpolated in step 122. The interpolation operation takes into account the difference between the timestamps of the obtained rendered frames and the modified timestamp of the synchronisation signal. As the timestamp of frame 5 is closer to the modified timestamp of the synchronisation signal, it has a greater influence in the interpolation operation compared to frame 6. In particular, frame 5 has a weighting of two thirds in the interpolation operation, and frame 6 has a weighted of one third.

In step 123, the interpolated rendered frame which is a synthesis of frames 5 and 6 is displayed. The display also provides a release command to the compositor which triggers the release of frame 4 from the frame queue in step 124.

Figure 13:
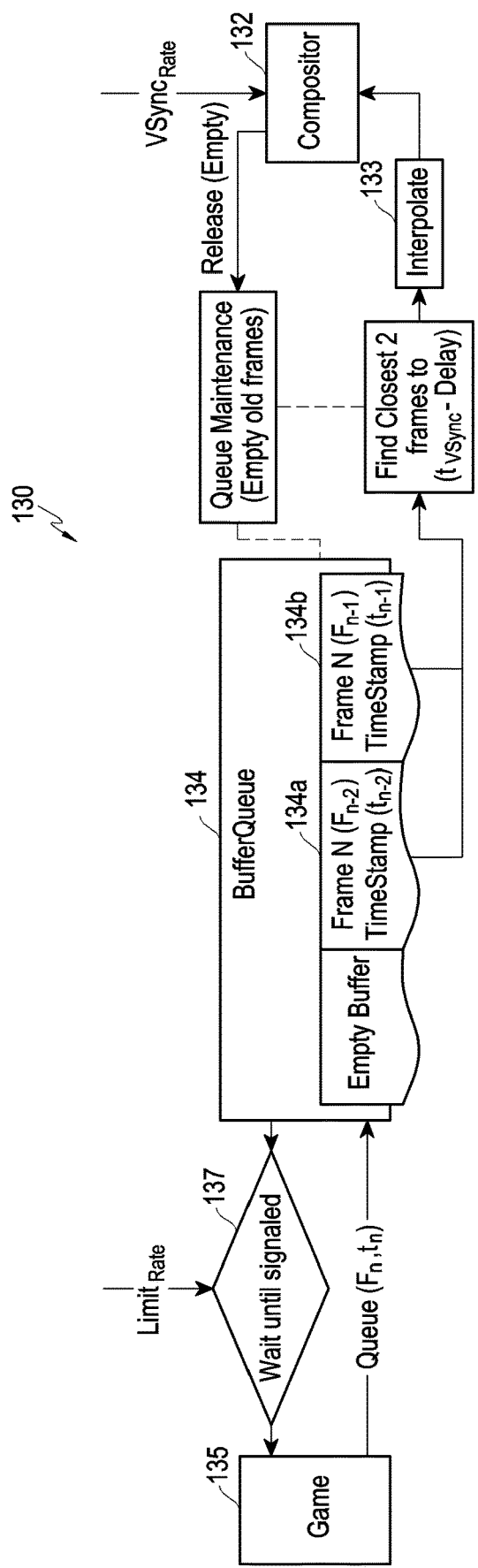
FIG. 13 is another example device according to aspects of the disclosure.

Referring to FIG. 13, there is shown another example of a device 130 according to the disclosure. This device is similar to the device shown in FIGS. 6 and 7 and includes a compositor 123, interpolator 133, buffer 134 and game engine 135.

In addition, the device 130 of FIG. 3 comprises a function block 137 that receives a limit rate signal. The limit rate signal controls the rate at which the game engine 135 receives a dequeue signal from the buffer, which in turn controls the rate at which the game engine 135 renders content. In this way, by providing a larger limit rate value, the game engine will reduce the rendering rate. The device 130 of FIG. 13 thus provides a way to adjust the rendering rate. Other ways for adjusting the frame rendering rate are within the scope of the disclosure.

Figure 14:
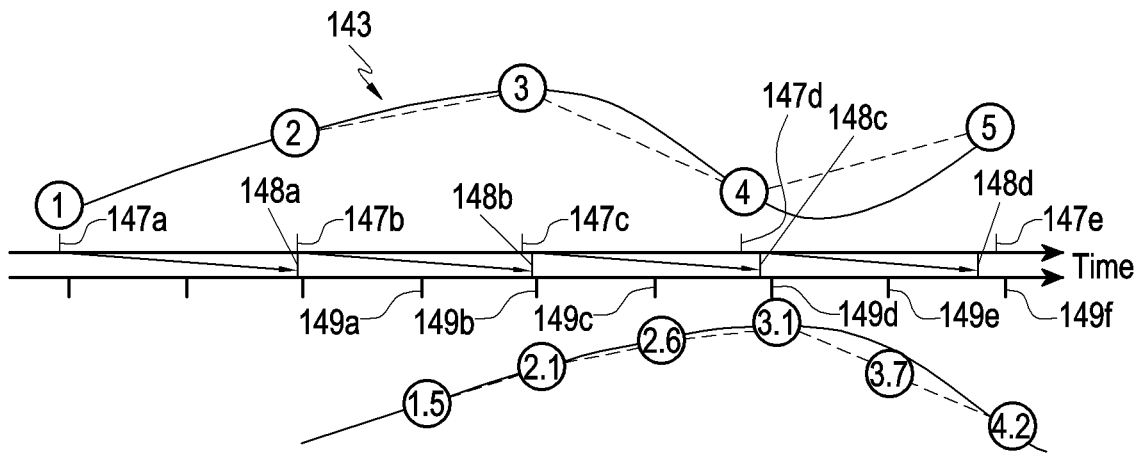
FIG. 14 is another frame sequence diagram for displaying rendered frames according to aspects of the disclosure.

Referring to FIG. 14, there is shown a frame sequence diagram highlighting an added benefit of the disclosure. In some situations, it may be desirable to reduce the rate at which content is rendered. The interpolator of the disclosure allows the rendered content to be up-converted back to the original frame rate so as to minimise the effect that this reduction rate may have on the user viewing the content.

The top half plot 143 of FIG. 14 shows the rendering of frames of content 1, 2, 3, 4, 5 at a reduced rendering rate. The y-axis indicates the motion within the content, and the x-axis 140 indicates the time. The solid line represents the actual motion within the content, and the dashed line represents the apparent motion viewed by the user due to the display of the rendered frames 1, 2, 3, 4, 5. The time at which the frames 1, 2, 3, 4, 5 are rendered are indicated by the dashes 147*a*, 147*b*, 147*c*, 147*d*, 147*e* on the time axis 140.

FIG. 14 shows that the rendered frames of content are each delayed by a predetermined delay value. In this example, the delay is achieved by adjusting the timestamps of the rendered frames such that they are shifted into the future. In other words, the predetermined delay value is added to each of the timestamps. The delayed timestamps are indicated by the dashes 148*a*, 148*b*, 148*c*, 148*d* in FIG. 14. Only the delay of frames 1, 2, 3 are specifically shown in FIG. 14.

The bottom half plot 145 shows the display refresh rate indicated by the dashes 149*a*, 149*b*, 149*c*, 149*d*, 149*e*, 149*f* between the time axis 140 and the time axis 141. The time axis 141 is shifted relative to the time axis 140 for ease of representation. It will be appreciated that the frames are delayed by a greater amount than indicated by the arrows in FIG. 14.

At each display refresh, an interpolated rendered frame 1.5, 2.1, 2.6, 3.1, 3.7, and 4.2 is generated and displayed. Importantly, since the display refresh rate is higher than the rendering rate, this has the effect of up-converting the rendered content such that it appears to be displayed at the original rendering rate.

The interpolated frame 1.5 is an interpolation of rendered frames 1 and 2. The interpolated frame 2.5 is an interpolation of rendered frames 2 and 3. The interpolated frame 3.2 is an interpolation of rendered frames 3 and 4. The interpolated frame 4.2 is an interpolation of rendered frames 4 and 5. The interpolated frame 4.8 is an interpolation of rendered frames 4 and 5. It can be seen that each interpolation operations takes into account the difference between the timestamps of the rendered frames and the display refresh time (the timestamp of the synchronisation signal). The closer the timestamp of the synchronisation signal is to one of the rendered frames, the greater the influence that rendered frame has in the interpolated rendered frame. This has the effect of synchronising the interpolated rendered frame with the synchronisation signal. Effectively, this means that the uneven timing problem present in existing implementations is avoided. Furthermore, because each displayed frame is an interpolated frame, that is a synthesised frame made up from a combination of two rendered frames, the problem of missed frames is also avoided.

In an example, the up-converting approach shown in FIG. 14 may be used to reduce the power consumption of the device when rendering the content. For example, the standard rendering rate of the content may be 60 frames per second. However, so as to reduce power consumption, the rendering rate may be reduced by 50% to 30 frames per second. Advantageously, the interpolator interpolates back to the original rendering rate of 60 frames per second such that the disturbance to the user is minimised. While the interpolator will still consume some power, the power consumption of the interpolator is generally lower than the power consumption required to render content at a higher rendering rate.

The power consumption of an example device when rendering content at 30 FPS and without any up-converting interpolation as per the disclosure may be 319 mA. The power consumption of the example device when rendering content at 60 FPS and without any up-converting interpolation as per the disclosure may be 446 mA. However, the power consumption of the example device when rendering content at 30 FPS and with up-converting interpolation back up to 60 FPS in accordance with the disclosure, may only be 344 mA. Effectively, this means that the disclosure is able to display content at a desired high frame rate (e.g. 60 FPS) so as to provide a good user experience, while achieving an approximate 30% power saving compared to approaches which just render content at the high frame rate.

In some examples, the device may be arranged to control the frame rendering rate according to content linked to the rendered frames. For example, the device may be arranged to detect an amount of motion in content linked to the rendered frames. The device may be arranged to control the frame rendering rate according to the detected amount of motion. This may mean that frame rendering rate is decreased such that less power is consumed by the device when the detected amount of motion is lower than a threshold value. In some examples, the frame rendering rate may be controlled according to aspects such as the significance of the motion rather than or in addition to the amount of motion. This may involve determining the saliency of the motion, the depth of motion, or the particular plane in 3D space in which the motion is occurring. Generally, when the amount of motion or the significance of the motion is reduced, the frame rendering rate may be decreased so as to reduce power consumption.

In some examples, the device is arranged to detect motion through inspection of the rendered frames using a motion estimation operation such as a motion search. Machine learning techniques may also be used to detect amounts of motion within the rendered frames. The amount of motion may be detected by receiving information from the game engine other than the rendered frames. The amount of motion may be detected via a user input to the device. For example, if a user makes a large and fast dragging motion across a touch screen of the device, the device may infer that there will be a large and quick scrolling motion which will be reflected in the rendered frames.

The device may be arranged to control the frame rendering rate according to a detected temperature level of the device. This may mean that the device is able to detect the temperature level of the device, and reduce the frame rendering rate if the detected temperature level exceeds a threshold value. Beneficially, reducing the frame rendering rate may help avoid the device overheating or raising further in temperature.

Figure 15:
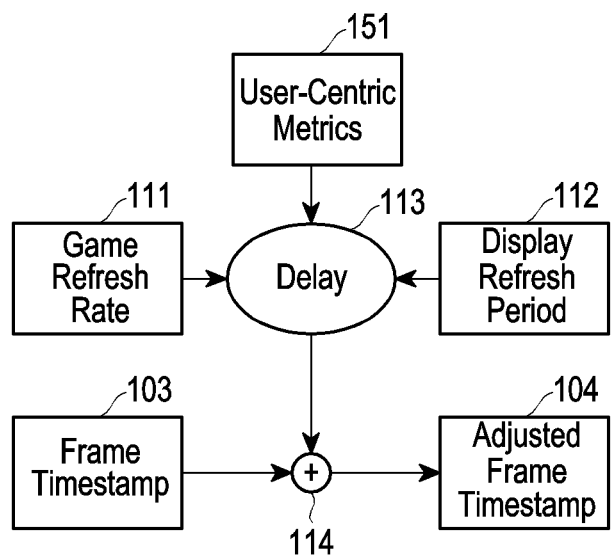
FIG. 15 is another example detailed view of an aspect of the process diagram of FIG. 10.

Referring to FIG. 15, there is shown another detailed view of part of the process flow diagram shown in FIG. 10. FIG. 15 is similar to FIG. 11 and like reference numerals have been used to indicate like components. FIG. 15, however, shows that an additional user-centric metric 151 is used in determining the delay. The user centric metrics 151 may include one or more of the level user interaction with the device, the level of user attention in relation to the content of the device, and user biometrics.

The above examples generally relate to online processing where frames of content are displayed as the frames are rendered.

The disclosure may also be used with offline processing. In offline processing all of the frames of content may be acquired in advance. The interpolation operation is the same as in online processing. That is, the device find the two closest frames in the buffer to the timestamp of the synchronisation signal and performs an interpolation operation that takes into account the difference between the timestamps of the rendered frames and the timestamps of the synchronisation signal.

It will be appreciated that for offline processing, the actual timestamps of the rendered frames is not important. Rather, as with online processing, it is the difference between the timestamps of the rendered frames which determines the influence of the rendered frames in the interpolated rendered frame. In one example of offline processing, the timestamps of all frames will be set relative to the first rendered frame. The first rendered frame may not be corrected, but the other rendered frames may be corrected and interpolated to generate content at a desired rate using the timings as a reference.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Although a few preferred embodiments of the disclosure have been shown and described, it will be appreciated by those skilled in the art that various changes and modifications might be made without departing from the scope of the disclosure, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

A method (or some operations of the method) according to various embodiments of the disclosure may be performed by at least one processor (e.g., a compositor 62, an interpolator 63), or by an electronic device (e.g., a device 60). An electronic device (e.g., a device 60) according to various embodiments may be include at least one processor (e.g., a compositor 62, an interpolator 63) or a memory (e.g., a buffer 64). An electronic device (e.g., a device 60) according to various embodiments may be further include a display (e.g., a display 61).

According to various embodiments of the disclosure, a device for processing rendered frames for display at a display refresh rate, the device may comprise, a buffer arranged to store a plurality of rendered frames rendered at a frame rendering rate and a time stamp for each of the rendered frames, a compositor arranged to obtain a timestamp of a synchronisation signal for synchronising the display of frames with the display refresh rate, and in response to obtaining the timestamp of the synchronisation signal, trigger access to the buffer to obtain two rendered frames having timestamps closest to the timestamp of the synchronisation signal, and an interpolator arranged to generate an interpolated rendered frame for display by performing an interpolation operation using the obtained two rendered frames. The interpolation operation may take into account the difference between the timestamps of each of the two rendered frames and the timestamp of the synchronisation signal.

According to various embodiments, one of the obtained rendered frames may have a timestamp before the timestamp of the synchronisation signal, and the other of the obtained rendered frames may have a timestamp after the timestamp of the synchronisation signal.

According to various embodiments, the interpolation operation may weight the influence of the two rendered frames in generating the interpolated rendered frame such that the rendered frame having the timestamp closest to the synchronisation signal has a greater influence on the interpolated rendered frame.

According to various embodiments, the interpolation operation may comprise a weighted average operation.

According to various embodiments, the compositor may be arranged to trigger access to the buffer to obtain two rendered frames having timestamps closest to the timestamp of the synchronisation signal, when the timestamps of the rendered frames are delayed by a predetermined delay value. The interpolation operation may take into account the difference between the timestamps of each of the two rendered frames and the timestamp of the synchronisation signal, when the timestamps of the rendered frames are delayed by the predetermined delay value.

According to various embodiments, the predetermined delay value may be determined according to the display refresh rate.

According to various embodiments, the predetermined delay value may be determined according to the frame rendering rate.

According to various embodiments, the predetermined delay value may be determined according to a time taken to render two frames at the frame rendering rate and a time taken to refresh the display at the display refresh rate.

According to various embodiments, the device may be operable to delay the timestamps of the rendered frames by the predetermined delay value.

According to various embodiments, the device may be operable to subtract the predetermined delay value from the timestamp of the synchronisation signal.

According to various embodiments, the frame rendering rate may be variable.

According to various embodiments, the frame rendering rate may be lower than the display refresh rate. The interpolation operation may comprise up-converting the rendered frames to the display refresh rate.

According to various embodiments, the device may be arranged to control the frame rendering rate.

According to various embodiments, the device may be arranged to control the frame rendering rate according to content linked to the rendered frames.

According to various embodiments, the device may be arranged to detect an amount of motion in content linked to the rendered frames, and may be arranged to control the frame rendering rate according to the detected amount of motion.

According to various embodiments, the device may be arranged to control the frame rendering rate so as to control a power consumption level of the device.

According to various embodiments, the device may be arranged to detect a battery level of the device, and may be arranged to control the frame rendering rate according to the detected battery level.

According to various embodiments, the device may be arranged to control the frame rendering rate according to a detected temperature level of the device.

According to various embodiments, the device may be arranged to control the frame rendering rate according to a detected of level of user interaction with the device.

According to various embodiments, the device may be arranged to control the frame rendering rate according to a detected level of user attention in relation to the content of the device, and/or wherein the device is arranged to control the frame rendering rate according to measured user biometrics.

According to various embodiments, the rendered frames may be game frames.

According to various embodiments, the device may be a portable electronic device.

According to various embodiments, the device may further comprise a display for displaying the interpolated rendered frame.

According to various embodiments of the disclosure, a method of processing rendered frames for display at a display refresh rate, the method may comprise, obtaining a timestamp of a synchronisation signal for synchronising the display of the frames with the display refresh rate, in response to obtaining the timestamp of the synchronisation signal, triggering access to a buffer, the buffer storing a plurality of rendered frames rendered at a frame rendering rate and a timestamp for each of the rendered frames, the triggering access being performed so as to obtain two rendered frames having timestamps closest to the timestamp of the synchronisation signal, and generating an interpolated rendered frame for display by performing an interpolation operation using the obtained two rendered frames. The interpolation operation may take into account the difference between the timestamps of each of the two rendered frames and the timestamp of the synchronisation signal.

According to various embodiments of the disclosure, a computer readable having instructions recorded thereon which, when executed by a processor of a computer, is operable to cause the computer to perform the method according to various embodiments.

According to various embodiments of the disclosure, a method of processing frames to display, the method may comprise, storing a plurality of first frames having timestamps, the first frames being obtained at a first rate, identifying a timestamp of a synchronisation signal to display at a second rate, identifying two first frames among the first frames based on the timestamp of the synchronisation signal, the two first frames having timestamps closest to the timestamp of the synchronisation signal, and generating a second frame to display using the two first frames. A timestamp for each of the first frames may be delayed by a predetermined delay value or the predetermined delay value may be subtracted from the timestamp of the synchronisation signal, for identifying the two first frames.

According to various embodiments, one of the two first frames may have a timestamp before the timestamp of the synchronisation signal, and the other of the two first frames may have a timestamp after the timestamp of the synchronisation signal.

According to various embodiments, the second frame may be an interpolated frame to be displayed and generated by an interpolation using the two first frames, and the interpolation may be performed based on the difference between timestamps of each of the two first frames and the timestamp of the synchronisation signal.

According to various embodiments, the interpolation may weight the influence of the two first frames in generating the second frame such that a first frame having a timestamp closer to the synchronisation signal among the two first frames has a greater influence on the second frame.

According to various embodiments, the interpolation may comprise a weighted average operation.

According to various embodiments, the first rate may be a frame rendering rate and the second rate may be a display refresh rate.

According to various embodiments, the predetermined delay value may be determined based on the first rate for obtaining the first frames.

According to various embodiments, the predetermined delay value may be determined based on the second rate for displaying second frames.

According to various embodiments, the first rate may be variable.

According to various embodiments, the first rate may be lower than the second rate, and the interpolation comprises up-converting the first frames to the second rate.

According to various embodiments, the method may further comprise displaying second frames at the second rate.

According to various embodiments of the disclosure, an electronic device for processing frames to display, the electronic device (e.g., a device 60) may comprise, a memory (e.g., a buffer 66), and at least one processor (e.g., an interpolator 63, a compositor 62) coupled to the memory.

The at least one processor may be configured to store a plurality of first frames having timestamps in the memory, the first frames being obtained at a first rate, identify a timestamp of a synchronisation signal to display at a second rate, identify two first frames among the first frames based on the timestamp of the synchronisation signal, the two first frames having timestamps closest to the timestamp of the synchronisation signal, and generate a second frame to display using the two first frames, a timestamp for each of the first frames may be delayed by a predetermined delay value or the predetermined delay value may be subtracted from the timestamp of the synchronisation signal, for identifying the two first frames.

According to various embodiments, one of the two first frames may have a timestamp before the timestamp of the synchronisation signal, and the other of the two first frames may have a timestamp after the timestamp of the synchronisation signal.

According to various embodiments, the electronic device may further comprise a display (e.g., a display 61) to display second frames at the second rate.

According to various embodiments, the at least one processor may further configured to control the first rate base on at least one of, content linked to the first frames, an amount of motion in content linked to the first frames, a power consumption level of the electronic device, a battery level of the electronic device, a temperature level of the electronic device, a level of user interaction with the electronic device, a level of user attention in relation to content of the electronic device, or user biometrics of the electronic device.

The invention claimed is:

1. A method of processing frames to display, the method comprising:
   storing a plurality of first frames having timestamps, the plurality of first frames being obtained at a first rate;
   identifying a timestamp of a synchronisation signal to display at a second rate;
   identifying two first frames among the plurality of first frames based on the timestamp of the synchronisation signal, the two first frames having timestamps closest to the timestamp of the synchronisation signal; and
   generating a second frame to display using the two first frames,
   wherein a timestamp for each of the plurality of first frames is delayed by a predetermined delay value or the predetermined delay value is subtracted from the timestamp of the synchronisation signal, for identifying the two first frames.

2. The method of claim 1, wherein one of the two first frames has a timestamp before the timestamp of the synchronisation signal, and the other of the two first frames has a timestamp after the timestamp of the synchronisation signal.

3. The method of claim 1, wherein the second frame is an interpolated frame to be displayed and generated by an interpolation using the two first frames, and the interpolation is performed based on a difference between timestamps of each of the two first frames and the timestamp of the synchronisation signal.

4. The method of claim 3, wherein the interpolation weights influences of the two first frames in generating the second frame such that a first frame having a timestamp closer to the synchronisation signal among the two first frames has a greater influence on the second frame.

5. The method of claim 4, wherein the interpolation comprises a weighted average operation.

6. The method of claim 3, wherein the first rate is lower than the second rate, and the interpolation comprises up-converting the plurality of first frames to the second rate.

7. The method of claim 1, wherein the first rate is a frame rendering rate and the second rate is a display refresh rate.

8. The method of claim 1, wherein the predetermined delay value is determined based on the first rate for obtaining the plurality of first frames.

9. The method of claim 1, wherein the predetermined delay value is determined based on the second rate for displaying second frames.

10. The method of claim 1, wherein the first rate is variable.

11. The method of claim 1, further comprising:
    displaying second frames at the second rate.

12. The method of claim 1, further comprising:
    controlling the first rate based on at least one of:
    content linked to the plurality of first frames,
    an amount of motion in content linked to the plurality of first frames,
    a power consumption level of an electronic device,
    a battery level of the electronic device,
    a temperature level of the electronic device,
    a level of user interaction with the electronic device,
    a level of user attention in relation to content of the electronic device, or
    user biometrics of the electronic device.

13. An electronic device for processing frames to display, the electronic device comprising:
    a memory; and
    at least one processor coupled to the memory, the at least one processor configured to:
      store a plurality of first frames having timestamps in the memory, the plurality of first frames being obtained at a first rate,
      identify a timestamp of a synchronisation signal to display at a second rate,
      identify two first frames among the plurality of first frames based on the timestamp of the synchronisation signal, the two first frames having timestamps closest to the timestamp of the synchronisation signal, and
      generate a second frame to display using the two first frames,
    wherein a timestamp for each of the plurality of first frames is delayed by a predetermined delay value or the predetermined delay value is subtracted from the timestamp of the synchronisation signal, for identifying the two first frames.

14. The electronic device of claim 13, wherein one of the two first frames has a timestamp before the timestamp of the synchronisation signal, and the other of the two first frames has a timestamp after the timestamp of the synchronisation signal.

15. The electronic device of claim 14, wherein the second frame is an interpolated frame to be displayed and generated by an interpolation using the two first frames, and the interpolation is performed based on a difference between timestamps of each of the two first frames and the timestamp of the synchronisation signal.

16. The electronic device of claim 15,
    wherein the interpolation weights influences of the two first frames in generating the second frame such that a first frame having a timestamp closer to the synchronisation signal among the two first frames has a greater influence on the second frame, wherein the interpolation comprises a weighted average operation, and wherein the first rate is a frame rendering rate and the second rate is a display refresh rate.

17. The electronic device of claim 15, wherein the first rate is variable, and wherein the first rate is lower than the second rate, and the interpolation comprises up-converting the plurality of first frames to the second rate.

18. The electronic device of claim 14, wherein the predetermined delay value is determined based on the first rate for obtaining the plurality of first frames, or the predetermined delay value is determined based on the second rate for displaying second frames.

19. The electronic device of claim 14, further comprising a display to display second frames at the second rate.

20. The electronic device of claim 14, wherein the at least one processor further configured to control the first rate based on at least one of:

content linked to the plurality of first frames, an amount of motion in content linked to the plurality of first frames, a power consumption level of the electronic device, a battery level of the electronic device, a temperature level of the electronic device, a level of user interaction with the electronic device, a level of user attention in relation to content of the electronic device, or user biometrics of the electronic device.

* * * * *